United States Patent [19]

Grundei

[11] Patent Number: 4,782,925

[45] Date of Patent: Nov. 8, 1988

[54] DOUBLE-TUBE VIBRATION DAMPER

[75] Inventor: Manfred Grundei, Niederwerrn, Fed. Rep. of Germany

[73] Assignee: Fichtel & Sachs AG

[21] Appl. No.: 948,050

[22] Filed: Dec. 31, 1986

[30] Foreign Application Priority Data

Jan. 25, 1986 [DE] Fed. Rep. of Germany ........... 3602224

[51] Int. Cl.4 ................................................ F16F 9/49
[52] U.S. Cl. ................................ 188/322.14; 188/284; 188/315; 267/64.11
[58] Field of Search ....................... 188/322.13, 322.14, 188/322.15, 315, 320, 299, 284; 267/64.11, 64.22

[56] References Cited

U.S. PATENT DOCUMENTS

| 4,076,276 | 2/1978 | Wijnhoven et al. | 188/322.14 X |
| 4,401,196 | 8/1983 | Grundei | 188/322.14 |
| 4,650,043 | 3/1987 | Eckersley | 188/322.14 |

FOREIGN PATENT DOCUMENTS

| 0140890 | 6/1949 | Australia | 188/322.14 |
| 0264308 | 8/1968 | Austria | 188/322.13 |
| 1069956 | 11/1959 | Fed. Rep. of Germany | 188/322.13 |
| 1226833 | 10/1966 | Fed. Rep. of Germany | . |

Primary Examiner—Andres Kashnikow
Assistant Examiner—Matthew C. Graham
Attorney, Agent, or Firm—Toren, McGeady & Associates

[57] ABSTRACT

In a double-tube vibration damper the flow of liquid from the lower working chamber to the reservoir chamber is controlled by a bottom valve. This bottom valve has additionally the function of hydraulic abutment for the piston rod when the piston rod approaches its innermost position. An abutment spring is connected with the inner end of the piston rod. This abutment spring cooperates with a control body being a part of the bottom valve and being urged towards a minimum damping position by a return spring. When the abutment spring abuts against the control body at a predetermined position of inward movement of the piston rod the control body is displaced towards a maximum damping position. The control body cooperates with a flow passage. Various embodiments of the flow passage are proposed in order to vary the characteristics of the bottom valve with respect to its function as hydraulic abutment.

22 Claims, 6 Drawing Sheets

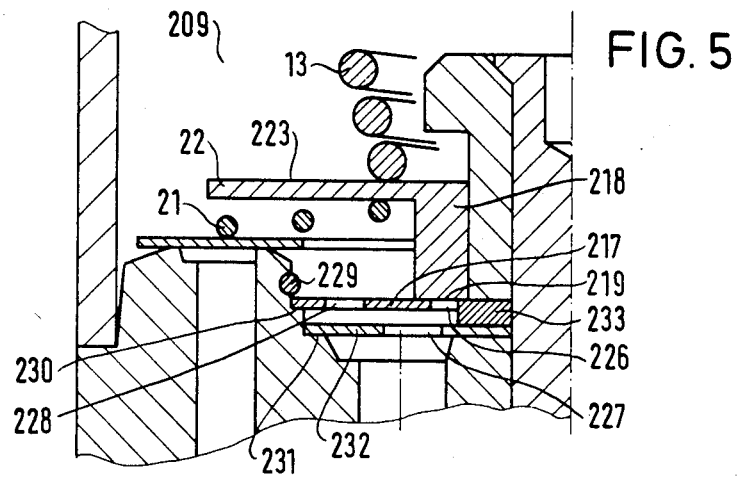
FIG. 5
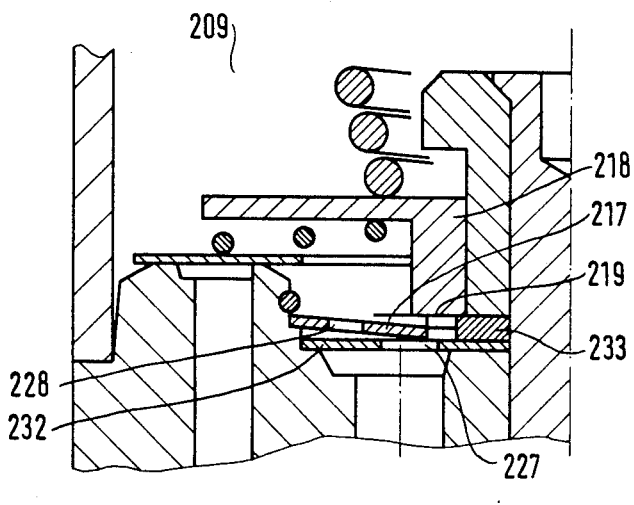
FIG. 7
FIG. 6

DOUBLE-TUBE VIBRATION DAMPER

BACKGROUND OF THE INVENTION

This invention relates to a double-tube vibration damper with a bottom valve unit between the lower working chamber remote from the piston rod. The bottom valve unit controls the flow of liquid between the lower working chamber and the reservoir chamber both in normal operation and when the piston rod approaches its innermost position. When the piston rod approaches its innermost position the bottom valve unit overtakes the function of a hydraulic abutment preventing mechanical impact of the piston rod on a mechanical abutment of the cylinder. The design of such a bottom valve unit is therefore a highly complicated problem both with respect to the function, long-term use and mass production.

STATEMENT OF THE PRIOR ART

A hydraulic abutment is known from German Publication No. 1 069 956. In this known construction the bottom valve cooperates with an abutment plate which abutment plate is fixed to an abutment spring, said abutment spring being fixed to the piston. Starting from a predetermined position on inward movement of the piston rod the abutment plate abuts against an abutment face of the bottom valve such as to vary the flow characteristics of the bottom valve. This hydraulic abutment requires much space. As long as the abutment plate does not abut against the abutment face of the bottom valve this bottom plate forms together with the abutment spring a free spring - mass system which can be excited into oscillation by transverse accelerations and, as a consequence thereof, may abut against the cylinder member and cause noise. Further noise occurs when the relatively heavy abutment plate abuts on fast inward movement of the piston rod against the abutment face of the bottom valve. A further problem is the assembling such that the axial position of the abutment plate is adjusted when the abutment spring is fixed to the piston on the one hand and to the abutment plate on the other hand.

From German Publication No. 1 226 833 there is known a vibration damper with a damping system dependent on the respective position of the piston rod. In this known construction two springs are used cooperating with a control pin. This construction requires also a relatively long axial space. Moreover, also in this known construction a spring - mass system occurs which can enter into natural oscillation. Such natural oscillation results in uncontrolled movement which may influence the damping control and cause abutment noises. Since the control pin is not only subject to the spring forces but also to flow forces in axial direction there is the risk that on fast inward movement of the piston rod the control pin is suddenly drawn by flow forces into a respective bore whereby damping forces may increase suddenly.

OBJECT OF THE INVENTION

It is an object of the present invention to provide a double-tube vibration damper with a bottom valve unit having a hydraulic abutment function which is simplified in design, has a high security of function, can be constructed with relatively short axial length, avoids noises and can be easily assembled. A further object of the present invention is to make the characteristics of the hydraulic abutment function variable such that desired damping force - velocity characteristics may be obtained.

SUMMARY OF THE INVENTION

In order to attain at least one of the above objects a double-tube vibration damper comprises a cylinder member having an axis and two ends, namely a first end and a second end. A container member surrounds the cylinder member. A piston rod member coaxial with the cylinder member extends inwards and outwards of the cylinder member through the first end thereof. A piston rod guiding and sealing unit substantially closes the cylinder member and the container member adjacent the first end and sealingly guides the piston rod member inwards and outwards of the cylinder member. An end wall closes the container member adjacent the second end. A bottom valve unit is provided adjacent the second end of the cylinder member. A piston unit is connected with the piston rod member within the cylinder member and a cavity is defined within the cylinder member axially between the piston rod guiding and sealing unit and the bottom valve unit. The cavity is separated by the piston unit into two working chambers, a first working chamber adjacent the piston rod sealing and guiding unit and a second working chamber adjacent the bottom valve unit. The cavity is substantially filled with a liquid and an annular reservoir chamber which is defined radially between the cylinder member and the container member is partially filled with said liquid and partially with a gas, e.g. with air. The working chambers are interconnected by piston unit passage means allowing liquid flow between the two working chambers. The bottom valve unit allows liquid flow between the second working chamber and the annular reservoir chamber and comprises an inward movement valve unit which allows liquid flow from the second working chamber to the annular reservoir chamber in response to inward movement of the piston rod member with respect to the cylinder member. The inward movement valve unit is variable in flow resistance in response to axial movement of the piston rod member. The piston rod member is provided at the inner end thereof with abutment spring means cooperating with the inward movement valve unit in response to inward movement of the piston rod member starting at a predetermined position during inward movement of the piston rod member. The inward movement valve unit comprises a control body connected with and axially movable with respect to the bottom valve unit between a minimum damping position and a maximum damping position. This control body is biased by return spring means towards the minimum damping position and is provided with a substantially axially directed abutment face. This abutment face is engageable by the abutment spring means on inward movement of the piston rod member starting at the predetermined position. The control body is movable by the abutment spring means towards the maximum damping position by the abutment spring means. The control body cooperates with inward movement flow passage means of the inward movement valve unit such as to vary a flow cross-sectional area of the inward movement flow passage means in response to axial movement of the control body.

According to this invention a hydraulic abutment is obtained which requires little axial space and is in simple in construction. The abutment spring means have a small mass and can without difficulties be shaped as a conical compression spring so that even high transverse acceleration cannot cause impingement of the spring means to the cylinder. The conical shape of the helical compression spring has further the advantage that the minimum length of the spring is very short. Even on high piston rod velocities in inward direction no considerable abutment noises occur. Assembly is easy because only the abutment spring means are to be connected with the piston rod member or piston whereas the control body is part of the bottom valve unit.

In view of simple mechanical construction the control body may cooperate with at least one flow passage opening defined by a flow passage disc. This flow passage disc may have the additional function of an abutment face for the control body defining the maximum damping position thereof.

It is also possible to shape the flow passage disc as a cup spring. By such shaping the flow cross-sectional area through the flow passage disc is gradually reduced such that the damping force is increased more slowly when the hydraulic abutment function starts.

The cup spring may be a part of the return spring means so that a further function is associated with the flow passage disc.

The abutment face of the control body is defined by a plurality of radially extending abutment arms.

In a preferred embodiment the control body is axially guided in a central area of the bottom valve unit and the flow passage disc is axially fixed by a radially outer circumferential zone thereof in a peripheral area of the bottom valve unit. A substantially axially directed end face of the control body cooperates with a radially inner circumferential zone of the flow passage disc in view of varying the flow resistance. In view of obtaining the above-defined object of easy variation of the flow characteristics in accordance with a desired damping force versus velocity of the piston rod curve it is further proposed that the maximum damping position of the control body is defined by an abutment face and the flow control disc is deflectable in response to pressure difference on both axial sides thereof such as to be liftable from the control body when the control body is in the maximum damping position by a pressure excess on the axial side adjacent the second working chamber. In this embodiment the flow characteristics is still variable after the control body has reached its maximum damping position by varying the deflecting characteristics of the control disc.

A further variation of the flow characteristics of the hydraulic abutment is obtained in that a secondary flow passage member is provided on the axial side of the flow passage disc remote from the control body, said secondary flow passage member defining a secondary flow passage opening and limiting the deflection of the flow passage disc, said secondary flow passage opening being at least partially closeable by deflection of the flow passage disc in response to the pressure excess. This embodiment results in a strong increase of the hydraulic abutment force on higher piston rod inward movement velocities.

A further possibility of varying the damping characteristics of the hydraulic abutment is obtained in that the flow passage disc is mechanically deflectable by the control body when the control body is in the maximum damping position defined by the abutment face. By this design the flow passage disc is mechanically biased when the control body has reached its maximum damping position defined by the said abutment face.

A further damping phase can be obtained by providing at least one pre-opening aperture in the flow passage disc such that at the start of the hydraulic abutment function only this pre-opening aperture is effective. This pre-opening aperture can be easily shaped by at least one bore of the flow passage disc. Since an axial distance is maintained between the flow passage disc and the secondary flow passage member there exists a space between these components so that no special attention has to be paid to the local allocation of the passages through the flow passage disc and the secondary flow passage member. It is of advantage to have an inner diameter of a secondary flow passage disc axially fixed and in combination therewith to form the secondary flow passage opening as at least one bore. By the position of this secondary flow passage bore in local relation to the inner diameter of the flow passage disc it is easily possible to define the flow cross-section for high piston rod velocities.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 5 shows in a further enlarged view the embodiment of FIG. 4 after the hydraulic abutment has become effective at relatively small inward movement velocity of the piston rod;

FIG. 6 shows the embodiment of FIG. 5 at a high inward movement velocity of the piston rod; and FIG. 7 shows the damping force - piston rod velocity characteristics of the embodiment according to FIGS. 4 to 6.

DESCRIPTION OF THE PREFERRED EMBODIMENTS

Figure 1:
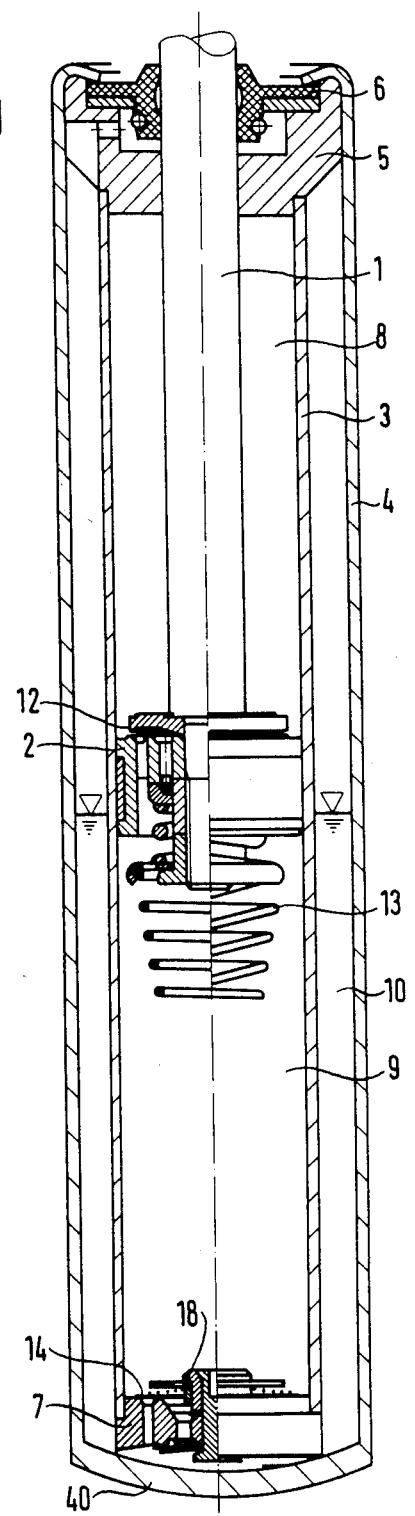
FIG. 1 shows a longitudinal section through a double-tube vibration damper of this invention.

With the double-tube vibration damper shown in FIG. 1 a piston rod member 1 is fixed to a piston 2 which is housed axially movably within a cylinder member 3. The piston rod member 1 is axially guided by a piston rod guiding and sealing unit 5, 6, the piston rod sealing member 6 sealingly engaging the piston rod 1. A container member 4 coaxially surrounds the cylinder member 3. The guiding and sealing unit 5, 6 and a bottom valve unit 7 are centering the cylinder member 3 within the container member 4. The container member 4 is closed by a bottom wall 40. Within the cylinder member 3 there is defined a cavity 8, 9 which is filled with a liquid. This cavity 8, 9 is separated by the piston unit 2 into two working chambers 8, 9. These working chambers 8 and 9 are interconnected for both directions of axial movement of the piston unit 2 by piston unit passage means 12 which may comprise separate valves for both directions. A reservoir chamber 10 is defined radially between the container member 4 and the cylinder member 3. This reservoir chamber 10 is in flow connection with the lower or second working chamber 9 through the bottom valve unit 7. The bottom valve unit 7 is of such design that it damps both inward movement of the piston rod member 1 and outward movement thereof. The reservoir chamber 10 is partially filled with the same liquid as the cavity 8, 9 and partially filled with air. The lower end of the piston rod member 1 or the piston unit 2 is provided with a conical helical compression spring 13, the lower end of which is to cooperate with the bottom valve unit 7 and more particularly with a control body 18 of the bottom valve unit 7.

Figure 2:
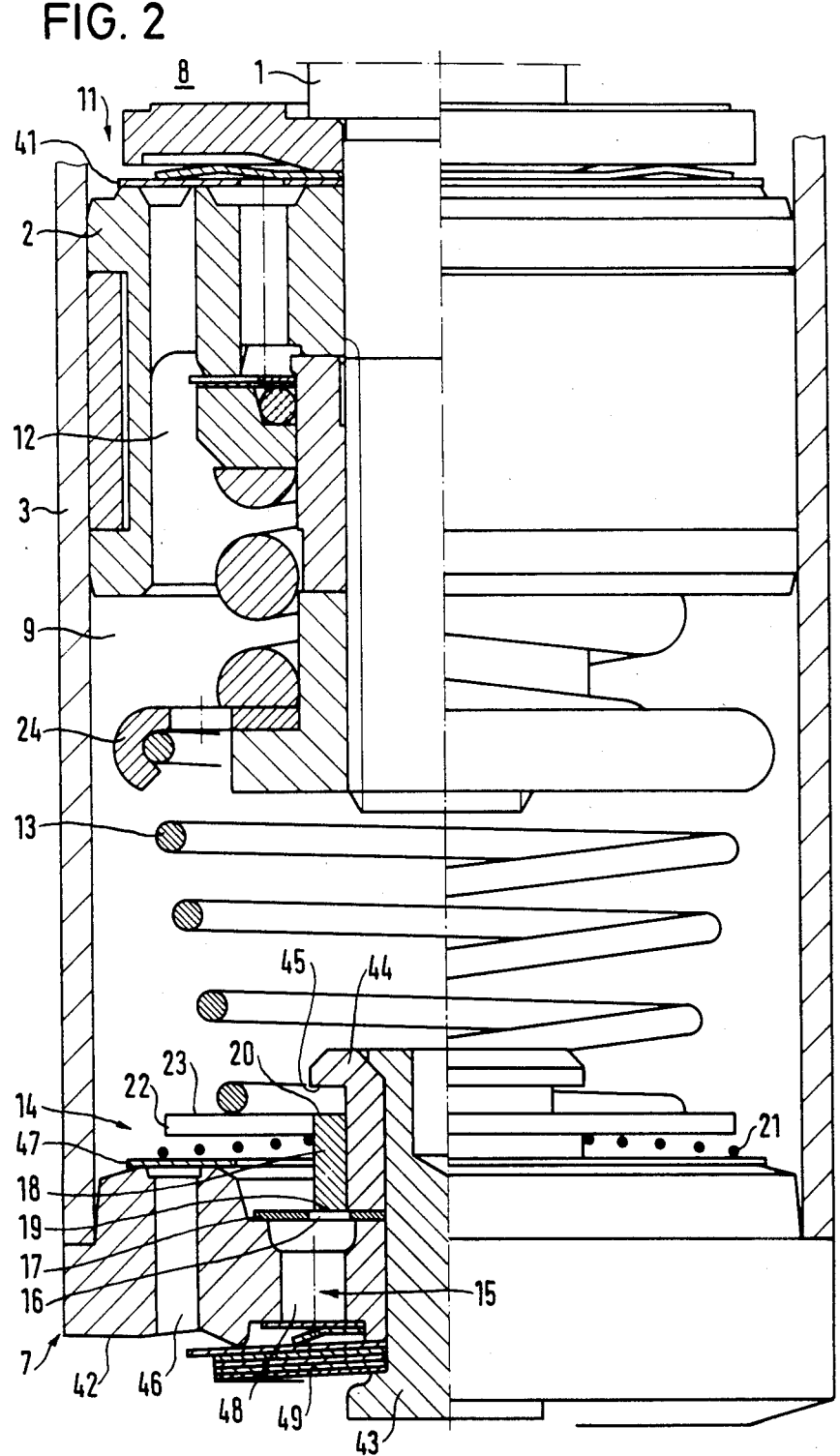
FIG. 2 shows a partial section of FIG. 1, namely the piston rod unit in cooperation with the bottom valve unit.

More details can be seen from FIG. 2. FIG. 2 shows in more detail the piston unit 2 with an outward movement piston valve unit 12 and an inward movement piston valve unit 41. The helical compression spring 13 is fixed to the lower end of the piston rod member 1 by a spring holder member 24.

Figure 2A:
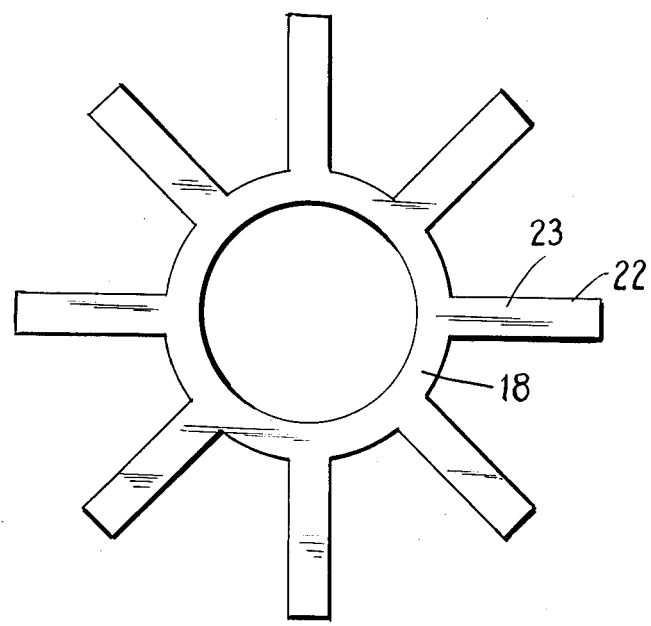
FIG. 2a shows a plan view of a control body forming part of the bottom valve unit.

The bottom valve unit 7 comprises a bottom valve main body 42. This bottom valve main body 42 centers the cylinder member 3 within the container member 4, as shown in FIG. 1. In the center of the bottom valve main body 42 there is provided a stem member 43 with a sleeve member 44. On the sleeve member 44 there is axially guided the control body 18, which control body 18 is provided with radially extending abutment arms 22 defining an abutment face 23 note FIG. 2a. The control body 18 is provided with a lower abutment face 19 and an upper abutment face 20 engageable with an abutment shoulder 45 of the sleeve 44. An axial bore 46, a valve plate 47 and a return spring 21 define an outward movement valve unit 14 of the bottom valve unit 7 which allows flow of liquid from the reservoir chamber 10 towards the working chamber 9 on outward movement of the piston rod member 1. The return spring 21 also acts onto the control body 18 so as to bias the control body 18 towards abutment of its abutment face 20 with the abutment shoulder 45 of the sleeve 44. An inward movement valve unit 15 of the bottom valve unit 7 allows flow of liquid from the working chamber 9 to the reservoir chamber 10 on inward movement of the piston rod member 1. This inward movement valve unit 15 comprises a bore 48 which is covered by a flow passage disc 17. The flow passage disc 17 is axially fixed on the bottom valve main body 42. The flow passage disc 17 is provided with a flow passage opening 16. The flow passage opening 16 is at least partially closeable by the flow control body 18 and defines a lower abutment for the abutment face 19 of the flow control body 18.

A further inward movement damping valve 49 is provided at the lower end of the bore 48.

According to FIG. 2 the helical compression spring 13 acts onto the abutment face 23. The control body 18 is displaced against the action of the return spring 21 with its abutment face 19 against the flow passage disc 17. This flow passage disc 17 is responsible by a plurality of bores 16 for the inward movement damping. In the shown position of the control body 18 the major part of the bore 16 is covered so that the substantially reduced remaining cross-sectional area causes a strong increase of the inward movement damping such as to define a hydraulic abutment. When the helical compression spring 13, due to outward movement of the piston rod member 1, is distressed and lifts from the abutment face 23 the return spring 21 brings the control body 18 into engagement with the abutment shoulder 45 so that the total cross-sectional flow passage is open and the hydraulic abutment is ineffective. Moreover, during the outward movement of the piston rod damping liquid can flow from the reservoir chamber 10 into the working chamber 9 through the outward movement valve 14. This is also possible when, due to the spring force of the helical compression spring 13, the control body 18 is still in engagement with the flow passage disc 17.

Figure 3:
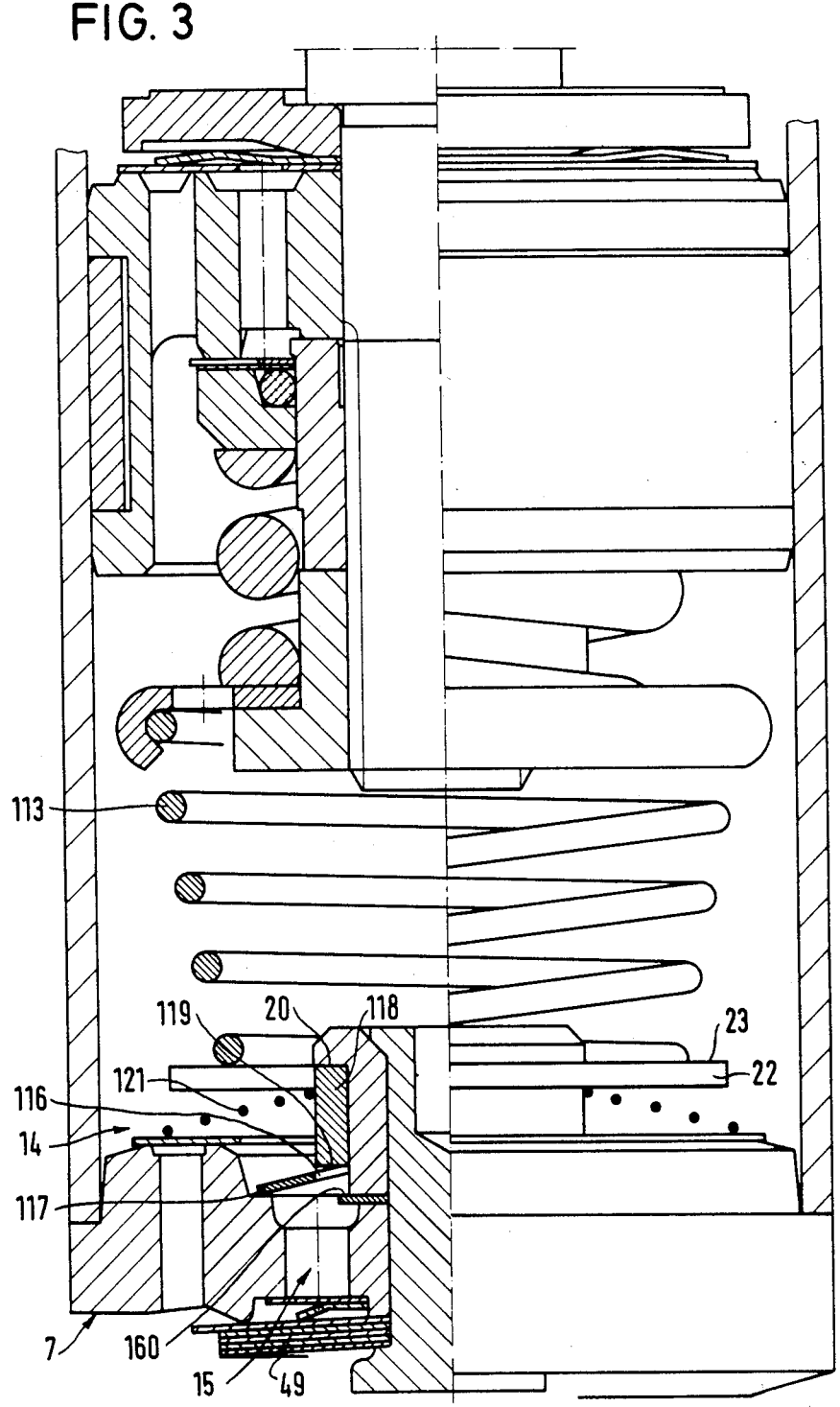
FIG. 3 shows a further embodiment of the bottom valve unit.

The embodiment of FIG. 3 differs from the embodiment of FIG. 2 substantially in that the flow passage disc 117 is shaped as a cup spring. This cup spring is supporting by its inner diameter the control body 118 and acts as a return spring when the spring 121 is very weak. Starting at a predetermined inward path of the piston rod member 1 the helical compression spring 113 acts against the force of the cup spring 117 so that the hydraulic abutment provides an increased hydraulic damping. In the lowermost position the cup spring 117 is applied against the abutment member 160 and the lower end face 119 of the control body 118 closes the major part of the flow passage openings 116. The not specifically described parts of the embodiment of FIG. 3 correspond to the embodiment of FIG. 2 and are therefore designated by the same reference numerals as in FIG. 2.

Figure 4:
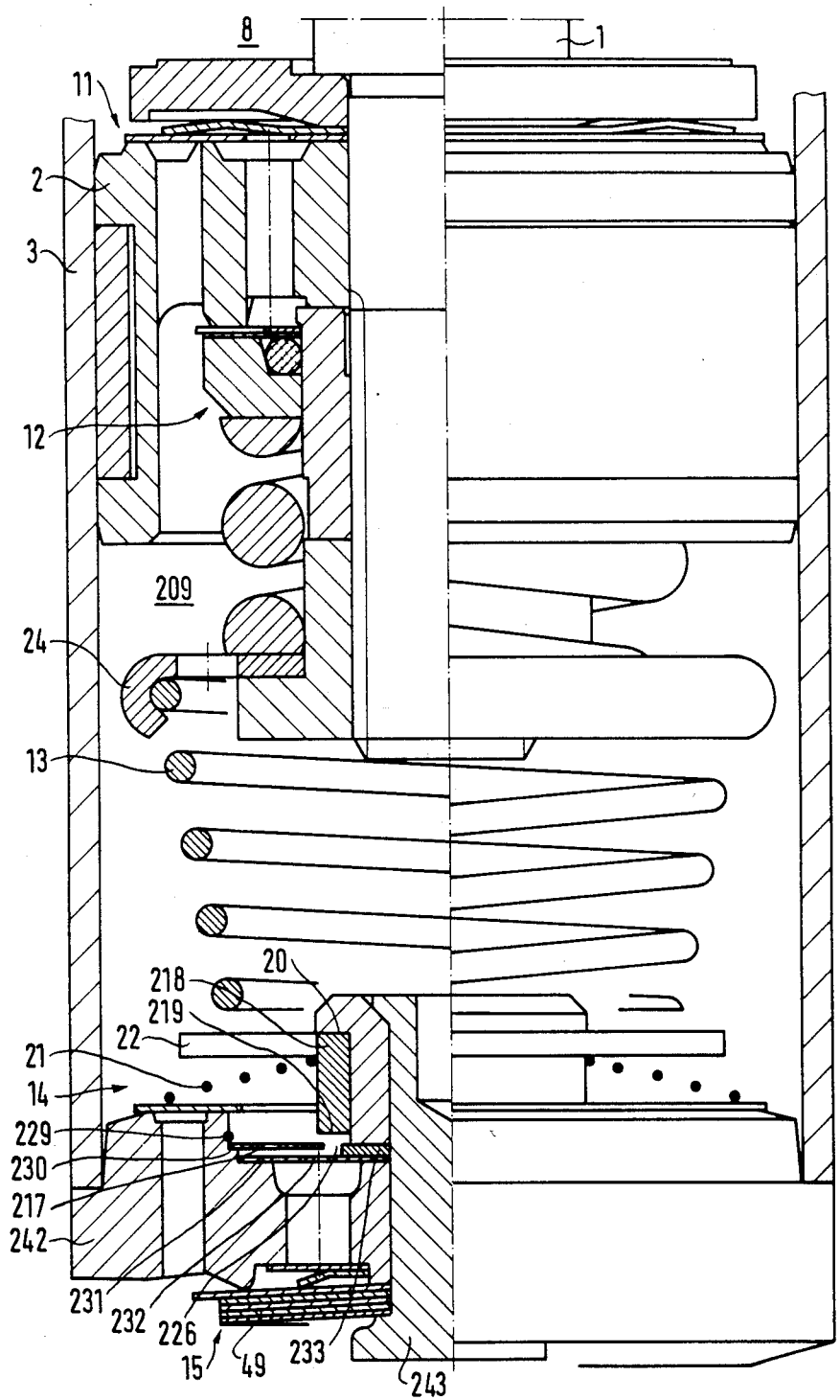
FIG. 4 shows a still further embodiment with a further modified bottom valve unit before the hydraulic abutment becomes effective.

In the embodiment of FIG. 4 those parts which are identic with respective parts of the embodiment of FIG. 2 are again designated by the same reference numerals. The flow passage disc 217 is axially fixed at its radially outer edge by a shoulder 230 of the bottom valve main body 242 and by a ring member 229. The radially inner edge of the flow passage disc 217 is in axial alignment with the abutment face 219 of the control body 218. An abutment member 233 is fixed to the stem 243. The flow passage disc 217 is of spring-type material. A secondary flow passage disc 232 is located in axial distance from the flow passage disc 217. This secondary flow passage disc 232 is positioned in axial direction by its radially outer zone on an abutment shoulder 231 and is fixed in its radially inner zone by the abutment member 233.

More details are shown in FIG. 5. As can be seen from FIG. 5, the flow passage disc 217 is provided with a pre-opening aperture 228 and the secondary flow passage disc 232 is provided with a secondary flow passage opening 227.

On inward movement of the piston rod the helical compression spring 13 abuts against the abutment face 223 of the control body 218. The control body 218 is displaced downwards until its abutment face 219 abuts against the abutment member 233. At the same time the abutment face 219 closes the annular gap between the abutment member 233 and the flow passage disc 217, thus increasing the flow resistance. If due to an increase of the inward movement velocity of the piston rod the pressure within the second working chamber 209 increases the flow passage disc 217 is deflected downwards, as shown in FIG. 6, until it abuts against the secondary flow passage disc 232, the control body 218 remaining in its lowermost position defined by the abutment member 233. The opening of the gap between the abutment face 219 and the flow passage disc 217 slows down the pressure rise within the working chamber 209 on further increase of the inward movement velocity of the piston rod. Finally, on further increase of the pressure within the working chamber 209 due to further increase of the inward movement velocity of the piston rod the flow passage disc 217 contacts the secondary flow passage disc 232 and partially closes the secondary flow passage opening 227.

It is to be noted that the pre-opening aperture 228 increases the pressure rise when the helical compression spring 13 first places the control body 218 into contact with the flow passage disc 217.

It is to be noted that the flow passage disc 217 may be with its upper face at a level above the upper face of the abutment member 233 so that the flow passage disc 217 is mechanically deflected into a biased condition before the control body 218 abuts by its abutment face 219 against the abutment member 233.

It is to be noted that the cross-sectional area of the gap 226 is larger than the cross-sectional area of the pre-opening aperture or apertures 228 so that in the position as shown in FIG. 4 the pre-opening aperture 228 is without substantial damping effect.

When the control body 218 is started to be moved downwards by the helical compression spring 13 the gap 226 is increasingly narrowed and finally closed. The pre-opening aperture 228 becomes effective. With increasing pressure in the working chamber 209 the flow passage disc 217 is deflected downwards. With further increasing pressure in the working chamber 209 the flow passage disc 217 contacts the secondary flow passage disc 232 and partially closes the secondary flow passage opening 227. The inward movement valve 49 is always in series connection with the flow cross-sectional area defined by the control body 218. Due to the axial space between the flow passage disc 217 and the secondary flow passage disc 232 no specific attention is to be paid to the localization of the pre-opening aperture 228 with respect to the secondary flow passage opening 227.

In the graph according to FIG. 7 the damping force is shown in dependency on the piston rod velocity. The line 34 shows in dependency of inward movement velocity the damping force obtained by the inward movement valve 49. As soon as the hydraulic abutment becomes effective the characteristic line 35 is achieved. This characteristic line 35 shows a three-phase effect of the hydraulic abutment. The section 35a of the line is obtained in the position of FIG. 5 when only the pre-opening aperture 228 is open. The section 35b of the line 35 is obtained when the flow passage disc 217 due to excess pressure within the working chamber 209 is lifted from the lower abutment face 219 of the control body 218. The section 35c is obtained when, as shown in FIG. 4, the flow passage disc 217 engages by its radially inner edge the secondary flow passage disc 232 and partially covers the secondary flow passage opening 227. The difference between the line 34 and the line 35 results from the damping force which is due to the hydraulic abutment.

It is to be noted that analogous parts have been designated by the same reference numerals in all FIGURES with the respective numbers being increased for FIG. 3 by 100 and for FIGS. 4, 5 and 6 by 200. Identic parts, as far as they have not been specifically designated in the description of FIGS. 2 to 6, have been designated by identic reference numerals as in FIG. 1.

While specific embodiments of the invention have been shown and described in detail to illustrate the application of the inventive principles, it will be understood that the invention may be embodied otherwise without departing from such principles.

What is claimed is:

1. A double-tube vibration damper comprising a cylinder member (3) having a axis and two ends, namely a first end and a second end,
   a container member (4) surrounding said cylinder member (3),
   a piston rod member (1) coaxial with said cylinder member (3) and extending inwards and outwards of said cylinder member (3) through the first end thereof,
   a piston rod guiding and sealing unit (5, 6) substantially closing said cylinder member (3) and said container member (4) adjacent said first end and sealingly guiding said piston rod member (1) inwards and outwards of said cylinder member (3),
   an end wall (4) closing said container member (4) adjacent said second end,
   a bottom valve unit (7) adjacent said second end of said cylinder member (3),
   a piston unit (2) connected with said piston rod member (1) within said cylinder member (3),
   a cavity (8, 0) being defined within said cylinder member (3) axially between said piston rod guiding and sealing unit (5, 7) and said bottom valve unit (7),
   said cavity (8, 9) being separated by said piston unit (2) into two working chambers, a first working chamber (8) adjacent said piston rod sealing and guiding unit (5, 6) and a second working chamber (9) adjacent said bottom valve unit (7),
   said cavity (8, 9) being substantially filled with a liquid,
   an annular reservoir chamber (10) being defined radially between said cylinder member (3) and said container member (4),
   said annular reservoir chamber (10) being partially filled with said liquid and partially filled with a gas,
   said working chambers (8, 9) being interconnected by piston unit passage means (11) allowing liquid flow between said two working chambers (8, 9),
   said bottom valve unit (7) allowing liquid flow between said second working chamber (9) and said annular reservoir chamber (10) and comprising an inward movement valve unit (15) allowing liquid flow from said second working chamber (9) to said annular reservoir chamber (10) in response to inward movement of said piston rod member (1) with respect to said cylinder member (3),
   said inward movement valve unit (15) being variable in flow resistance in response to axial movement of said piston rod member (1),
   said piston rod member (1) being provided at the inner end thereof with abutment spring means (13) cooperating with said inward movement valve unit (15) in response to inward movement of said piston rod member (1) starting at a predetermined position during inward movement of said piston rod member (1),
   said inward movement valve unit (15) comprising a control body (18) connected with and axially movable with respect to said bottom valve unit (7) between a minimum damping position and a maximum damping position, being biased by return spring means (21) towards said minimum damping position and being provided with a substantially axially directed abutment face (23), said abutment face (23) being engageable by said abutment spring means (13) on inward movement by said piston rod member (1) starting at said predetermined position, said control body (18) being movable by said abutment spring means (13) towards said maximum damping position, said control body (18) cooperating with inward movement flow passage means (17, 16) of said inward movement valve unit (15) such as to vary a flow cross-sectional area of said inward movement flow passage means (17, 16) in response to axial movement of said control body (18), said control body (18) cooperates with at least one flow passage opening (16) defined by a flow passage disc (17), said flow passage disc (117) is shaped as a cup spring, and said cup spring (117) establishes at least part of said return spring means.

2. A double-tube vibration damper comprising a cylinder member (3) having a axis and two ends, namely a first end and a second end, a container member (4) surrounding said cylinder member (3), a piston rod member (1) coaxial with said cylinder member (3) and extending inwards and outwards of said cylinder member (3) through the first end thereof, a piston rod guiding and sealing unit (5, 6) substantially closing said cylinder member (3) and said container member (4) adjacent said first end and sealingly guiding said piston rod member (1) inwards and outwards of said cylinder member (3), an end wall (4) closing said container member (4) adjacent said second end, a bottom valve unit (7) adjacent said second end of said cylinder member (3), a piston unit (2) connected with said piston rod member (1) within said cylinder member (3), a cavity (8, 9) being defined within said cylinder member (3) axially between said piston rod guiding and sealing unit (5, 7) and said bottom valve unit (7), said cavity (8, 9) being separated by said piston unit (2) into two working chambers, a first working chamber (8) adjacent said piston rod sealing and guiding unit (5, 6) and a second working chamber (9) adjacent said bottom valve unit (7), said cavity (8, 9) being substantially filled with a liquid, an annular reservoir chamber (10) being defined radially between said cylinder member (3) and said container member (4), said annular reservoir chamber (10) being partially filled with said liquid and partially filled with a gas, said working chambers (8, 9) being interconnected by piston unit passage means (11) allowing liquid flow between said two working chambers (8, 9), said bottom valve unit (7) allowing liquid flow between said second working chamber (9) and said annular reservoir chamber (10) and comprising an inward movement valve unit (15) allowing liquid flow from said second working chamber (9) to said annular reservoir chamber (10) in response to inward movement of said piston rod member (1) with respect to said cylinder member (3), said inward movement valve unit (15) being variable in flow resistance in response to axial movement of said piston rod member (1), said piston rod member (1) being provided at the inner end therof with abutment spring means (13) cooperating with said inward movement valve unit (15) in response to inward movement of said piston rod member (1) starting at a predetermined position during inward movement of said piston rod member (1), said inward movement valve unit (15) comprising a control body (18) connected with and axially movable with respect to said bottom valve unit (7) between a minimum damping position and a maximum damping position, being biased by return spring means (21) towards said minimum damping position and being provided with a substantially axially directed abutment face (23), said abutment face (23) being engageable by said abutment spring means (13) on inward movement by said piston rod member (1) starting at said predetermined position, said control body (18) being movable by said abutment spring means (13) towards said maximum damping position, said control body (18) cooperating with inward movement flow passage means (17, 16) of said inward movement valve unit (15) such as to vary a flow cross-sectional area of said inward movement flow passage means (17, 16) in response to axial movement of said control body (18), said control body (18) cooperates with at least one flow passage opening (16) defined by a flow passage disc (17), said flow passage disc (117) is shaped as a cup spring, said flow passage opening (116) in said cup spring (117) is defined by at least one recess of said cup spring (117) adjacent at and extending to a radially inner edge of said cup spring (117).

3. A double-tube vibration damper comprising a cylinder member (3) having a axis and two ends, namely a first end and a second end, a container member (4) surrounding said cylinder member (3), a piston rod member (1) coaxial with said cylinder member (3) and extending inwards and outwards of said cylinder member (3) through the first end thereof, a piston rod guiding and sealing unit (5, 6) substantially closing said cylinder member (3) and said container member (4) adjacent said first end and sealingly guiding said piston rod member (1) inwards and outwards of said cylinder member (3), an end wall (4) closing said container member (4) adjacent said second end, a bottom valve unit (7) adjacent said second end of said cylinder member (3), a piston unit (2) connected with said piston rod member (1) within said cylinder member (3), a cavity (8, 9) being defined within said cylinder member (3) axially between said piston rod guiding and sealing unit (5, 7) and said bottom valve unit (7), said cavity (8, 9) being separated by said piston unit (2) into two working chambers, a first working chamber (8) adjacent said piston rod sealing and guiding unit (5, 6) and a second working chamber (9) adjacent said bottom valve unit (7), said cavity (8, 9) being substantially filled with a liquid, an annular reservoir chamber (10) being defined radially between said cylinder member (3) and said container member (4), said annular reservoir chamber (10) being partially filled with said liquid and partially filled with a gas, said working chambers (8, 9) being interconnected by piston unit passage means (11) allowing liquid flow between said two working chambers (8, 9), said bottom valve unit (7) allowing liquid flow between said second working chamber (9) and said annular reservoir chamber (10) and comprising an inward movement valve unit (15) allowing liquid flow from said second working chamber (9) to said annular reservoir chamber (10) in response to inward movement of said piston rod member (1) with respect to said cylinder member (3), said inward movement valve unit (15) being variable in flow resistance in response to axial movement of said piston rod member (1), said piston rod member (1) being provided at the inner end therof with abutment spring means (13) cooperating with said inward movement valve unit (15) in response to inward movement of said piston rod member (1) starting at a predetermined position during inward movement of said piston rod member (1), said inward movement valve unit (15) comprising a control body (18) connected with and axially movable with respect to said bottom valve unit (7) between a minimum damping position and a maximum damping position, being biased by return spring means (21) towards said minimum damping position and being provided with a substantially axially directed abutment face (23), said abutment face (23) being engageable by said abutment spring means (13) on inward movement by said piston rod member (1) starting at said predetermined position, said control body (18) being movable by said abutment spring means (13) towards said maximum damping position, said control body (18) cooperating with inward movement flow passage means (17, 16) of said inward movement valve unit (15) such as to vary a flow cross-sectional area of said inward movement flow passage means (17, 16) in response to axial movement of said control body (18), and said abutment face (23) of said control body (18) is defined by a plurality of radially extending abutment arms (22).

4. A double-tube vibration damper comprising a cylinder member (3) having a axis and two ends, namely a first end and a second end, a container member (4) surrounding said cylinder member (3), a piston rod member (1) coaxial with said cylinder member (3) and extending inwards and outwards of said cylinder member (3) through the first end thereof, a piston rod guiding and sealing unit (5, 6) substantially closing said cylinder member (3) and said container member (4) adjacent said first end and sealingly guiding said piston rod member (1) inwards and outwards of said cylinder member (3), an end wall (4) closing said container member (4) adjacent said second end, a bottom valve unit (7) adjacent said second end of said cylinder member (3), a piston unit (2) connected with said piston rod member (1) within said cylinder member (3), a cavity (8, 9) being defined within said cylinder member (3) axially between said piston rod guiding and sealing unit (5, 7) and said bottom valve unit (7), said cavity (8, 9) being separated by said piston unit (2) into two working chambers, a first working chamber (8) adjacent said piston rod sealing and guiding unit (5, 6) and a second working chamber (9) adjacent said bottom valve unit (7), said cavity (8, 9) being substantially filled with a liquid, an annular reservoir chamber (10) being defined radially between said cylinder member (3) and said container member (4), said annular reservoir chamber (10) being partially filled with said liquid and partially filled with a gas, said working chambers (8, 9) being interconnected by piston unit passage means (11) allowing liquid flow between said two working chambers (8, 9), said bottom valve unit (7) allowing liquid flow between said second working chamber (9) and said annular reservoir chamber (10) and comprising an inward movement valve unit (15) allowing liquid flow from said second working chamber (9) to said annular reservoir chamber (10) in response to inward movement of said piston rod member (1) with respect to said cylinder member (3), said inward movement valve unit (15) being variable in flow resistance in response to axial movement of said piston rod member (1), said piston rod member (1) being provided at the inner end therof with abutment spring means (13) cooperating with said inward movement valve unit (15) in response to inward movement of said piston rod member (1) starting at a predetermined position during inward movement of said piston rod member (1), said inward movement valve unit (15) comprising a control body (18) connected with an axially movable with respect to said bottom valve unit (7) between a minimum damping position and a maximum damping position, being biased by return spring means (21) towards said minimum damping position and being provided with a substantially axially directed abutment face (23), said abutment face (23) being engageable by said abutment spring means (13) on inward movement of said piston rod member (1) starting at said predetermined position, said control body (18) being movable by said abutment spring means (13) towards said maximum damping position, said control body (18) cooperating with inward movement flow passage means (17, 16) of said inward movement valve unit (15) such as to vary a flow cross-sectional area of said inward movement flow passage means (17, 16) in response to axial movement of said control body (18), and said control body (218) is axially guided in a central area of said bottom valve unit (7) and said flow passage disc (217) is axially fixed by a radially outer circumferential zone therof in a peripheral area of said bottom valve unit (7), an end face (219) of said control body (218) cooperating with a radially inner circumferential zone of said flow passage disc (217).

5. A double-tube vibration damper comprising a cylinder member (3) having a axis and two ends, namely a first end and a second end,
- a container member (4) surrounding said cylinder member (3),
- a piston rod member (1) coaxial with said cylinder member (3) and extending inwards and outwards of said cylinder member (3) through the first end thereof,
- a piston rod guiding and sealing unit (5, 6) substantially closing said cylinder member (3) and said container member (4) adjacent said first end and sealingly guiding said piston rod member (1) inwards and outwards of said cylinder member (3),
- an end wall (4) closing said container member (4) adjacent said second end,
- a bottom valve unit (7) adjacent said second end of said cylinder member (3),
- a piston unit (2) connected with said piston rod member (1) within said cylinder member (3),
- a cavity (8, 9) being defined within said cylinder member (3) axially between said piston rod guiding and sealing unit (5, 7) and said bottom valve unit (7),
- said cavity (8, 9) being separated by said piston unit (2) into two working chambers, a first working chamber (8) adjacent said piston rod sealing and guiding unit (5, 6) and a second working chamber (9) adjacent said bottom valve unit (7),
- said cavity (8, 9) being substantially filled with a liquid,
- an annular reservoir chamber (10) being defined radially between said cylinder member (3) and said container member (4),
- said annular reservoir chamber (10) being partially filled with said liquid and partially filled with a gas,
- said working chambers (8, 9) being interconnected by piston unit passage means (11) allowing liquid flow between said two working chambers (8, 9),
- said bottom valve unit (7) allowing liquid flow between said second working chamber (9) and said annular reservoir chamber (10) and comprising an inward movement valve unit (15) allowing liquid flow from said second working chamber (9) to said annular reservoir chamber (10) in response to inward movement of said piston rod member (1) with respect to said cylinder member (3),
- said inward movement valve unit (15) being variable in flow resistance in response to axial movement of said piston rod member (1),
- said piston rod member (1) being provided at the inner end therof with abutment spring means (13) cooperating with said inward movement valve unit (15) in response to inward movement of said piston rod member (1) starting at a predetermined position during inward movement of said piston rod member (1),
- said inward movement valve unit (15) comprising a control body (18) connected with and axially movable with respect to said bottom valve unit (7) between a minimum damping position and a maximum damping position, being biased by return spring means (21) towards said minimum damping position and being provided with a substantially axially directed abutment face (23), said abutment face (23) being engageable by said abutment spring means (13) on inward movement by said piston rod member (1) starting at said predetermined position, said control body (18) being movable by said abutment spring means (13) towards said maximum damping position,
- said control body (18) cooperating with inward movement flow passage means (17, 16) of said inward movement valve unit (15) such as to vary a flow cross-sectional area of said inward movement flow passage means (17, 16) in response to axial movement of said control body (18),
- said control body (18) cooperates with at least one flow passage opening (16) defined by a flow passage disc (17), and
- said flow passage disc (217) comprises at least one pre-opening aperture (228).

6. A double-tube vibration damper comprising a cylinder member (3) having a axis and two ends, namely a first end and a second end,
- a container member (4) surrounding said cylinder member (3),
- a piston rod member (1) coaxial with said cylinder member (3) and extending inwards and outwards of said cylinder member (3) through the first end thereof,
- a piston rod guiding and sealing unit (5, 6) substantially closing said cylinder member (3) and said container member (4) adjacent said first end and sealingly guiding said piston rod member (1) inwards and outwards of said cylinder member (3),
- an end wall (4) closing said container member (4) adjacent said second end,
- a bottom valve unit (7) adjacent said second end of said cylinder member (3),
- a piston unit (2) connected with said piston rod member (1) within said cylinder member (3),
- a cavity (8, 9) being defined within said cylinder member (3) axially between said piston rod guiding and sealing unit (5, 7) and said bottom valve unit (7),
- said cavity (8, 9) being separated by said piston unit (2) into two working chambers, a first working chamber (8) adjacent said piston rod sealing and guiding unit (5, 6) and a second working chamber (9) adjacent said bottom valve unit (7),
- said cavity (8, 9) being substantially filled with a liquid,
- an annular reservoir chamber (10) being defined radially between said cylinder member (3) and said container member (4),
- said annular reservoir chamber (10) being partially filled with said liquid and partially filled with a gas,
- said working chambers (8, 9) being interconnected by piston unit passage means (11) allowing liquid flow between said two working chambers (8, 9),
- said bottom valve unit (7) allowing liquid flow between said second working chamber (9) and said annular reservoir chamber (10) and comprising an inward movement valve unit (15) allowing liquid flow from said second working chamber (9) to said annular reservoir chamber (10) in response to inward movement of said piston rod member (1) with respect to said cylinder member (3),
- said inward movement valve unit (15) being variable in flow resistance in response to axial movement of said piston rod member (1),
- said piston rod member (1) being provided at the inner end therof with abutment spring means (13) cooperating with said inward movement valve unit (15) in response to inward movement of said piston rod member (1) starting at a predetermined position during inward movement of said piston rod member (1), said inward movement valve unit (15) comprising a control body (18) connected with and axially movable with respect to said bottom valve unit (7) between a minimum damping position and a maximum damping position, being biased by return spring means (21) towards said minimum damping position and being provided with a substantially axially directed abutment face (23), said abutment face (23) being engageable by said abutment spring means (13) on inward movement by said piston rod member (1) starting at said predetermined position, said control body (18) being movable by said abutment spring means (13) towards said maximum damping position, said control body(18) cooperating with inward movement flow passage means (17, 16) of said inward movement valve unit (15) such as to vary a flow cross-sectional area of said inward movement flow passage means (17, 16) in response to axial movement of said control body (18), and said inward movement valve unit (7) comprising at least one further inward movement damping valve (49) in series with said inward movement flow passage means (17, 16).

7. A double-tube vibration damper as set forth in claims 3 or 6, wherein said control body (18) cooperates with at least one flow passage opening (16) defined by a flow passage disc (17).

8. A double-tube vibration damper as set forth in claims 3, 4 or 6, wherein said flow passage disc (17) acts as an abutment disc defining said maximum damping position of said control body (18).

9. A double-tube, vibration damper as set forth in claims 3, 4 or 6, wherein said flow passage disc (117) is shaped as a cup spring.

10. A double-tube vibration damper as set forth in claims 2, 3 or 6, wherein said cup spring (117) establishes at least part of said return spring means.

11. A double-tube vibration damper as set forth in claims 3 or 6, wherein said flow passage opening (116) in said cup spring (117) is defined by at least one recess of said cup spring (117) adjacent at and extending to a radially inner edge of said cup spring (117).

12. A double-tube vibration damper as set forth in claims 2 or 6, wherein said abutment face (23) of said control body (18) is defined by a plurality of radially extending abutment arms (22).

13. A double-tube vibration damper as set forth in claims 5 or 6, wherein said control body (218) is axially guided in a central area of said bottom valve unit (7) and said flow passage disc (217) is axially fixed by a radially outer circumferential zone thereof in a peripheral area of said bottom valve unit (7), an end face (219) of said control body (218) cooperating with a radially inner circumferential zone of said flow passage disc (217).

14. A double-tube vibration damper as set forth in claims 4, 5 or 6, where the maximum damping position of said control body (218) is defined by an abutment face (233) and said flow control disc (217) is deflectable in response to pressure difference on both axial sides thereof such as to be liftable from said control body (218) when said control body (218) is in said maximum damping position by a pressure excess on the axial side adjacent said second working chamber (209).

15. A double-tube vibration damper as set forth in claim 14, wherein said flow passage disc (217) is mechanically deflectable by said control body (218) when said control body (218) moves towards said maximum damping position.

16. A double-tube vibration damper as set forth in claims 4, 5 or 6, wherein a secondary flow passage member (232) is provided on the axial side of said flow passage disc (217) remote from said control body (218), said secondary flow passage member (232) defining a secondary flow passage opening (226) and limiting the deflection of said flow passage disc (217), said secondary flow passage opening (226) being at least partially closeable by deflection of said flow passage disc (217) in response to said pressure excess.

17. A double-tube vibration damper as set forth in claim 16, wherein said secondary flow passage member (232) is defined by a secondary flow passage disc (232), said secondary flow passage disc (232) being axially fixed at both a radially inner edge and a radially outer edge thereof and being provided with at least one bore (227) radially between said inner edge and said outer edge, said bore (227) defining said secondary flow passage opening (227).

18. A double-tube vibration damper as set forth in claims 4, or 6 wherein said flow passage disc (217) comprises at least one pre-opening aperture (228).

19. A double-tube vibration damper as set forth in claim 18, wherein said pre-opening aperture (228) is defined by at least one bore (228).

20. A double-tube vibration damper as set forth in claims 1, 2, 3, 4 or 5 said inward movement valve unit (7) comprising at least one further inward movement damping valve (49) in series with said inward movement flow passage means (17, 16).

21. A double-tube vibration damper as set forth in claim 1, 2, 3, 4, 5 or 6, wherein said abutment spring means (13) comprise at least one helical abutment spring (13).

22. A double-tube vibration damper as set forth in claim 16, wherein said helical abutment spring (13) has a conical shape with the maximum diameter being located adjacent the inner end of the piston rod member (1) and the minimum diameter end being adjacent said control body (18).

* * * * *